(12) United States Patent
Freedman et al.

(10) Patent No.: US 10,369,482 B2
(45) Date of Patent: Aug. 6, 2019

(54) DOME THEATER RIDE SYSTEM AND METHOD

(71) Applicant: Universal City Studios LLC, Universal City, CA (US)

(72) Inventors: Daniel M. Freedman, Orlando, FL (US); Nathanael G. White, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/798,105

(22) Filed: Oct. 30, 2017

(65) Prior Publication Data

US 2018/0311587 A1 Nov. 1, 2018

Related U.S. Application Data

(60) Provisional application No. 62/490,933, filed on Apr. 27, 2017.

(51) Int. Cl.
| | |
|---|---|
| *A63G 31/02* | (2006.01) |
| *A63J 25/00* | (2009.01) |
| *A63G 31/16* | (2006.01) |
| *E04H 3/22* | (2006.01) |
| *H02K 17/36* | (2006.01) |
| *E04B 1/346* | (2006.01) |

(Continued)

(52) U.S. Cl.
CPC ............ *A63G 31/02* (2013.01); *A63G 31/16* (2013.01); *A63J 25/00* (2013.01); *E04B 1/346* (2013.01); *E04H 3/22* (2013.01); *H02K 17/36* (2013.01); *E04B 1/3211* (2013.01); *E04B 2001/0061* (2013.01)

(58) Field of Classification Search
CPC ....... A63G 31/02; A63G 31/16; E04B 1/3211; E04B 1/346; E04B 2001/0061; E04H 3/22; A63J 25/00; H02K 17/36
USPC .......................................... 52/9, 10
See application file for complete search history.

(56) References Cited

U.S. PATENT DOCUMENTS

| | | | | |
|---|---|---|---|---|
| 3,135,057 A | * | 6/1964 | Nelson ................. | B64G 7/00 244/1 R |
| 4,856,771 A | | 8/1989 | Nelson et al. | |

(Continued)

FOREIGN PATENT DOCUMENTS

| | | |
|---|---|---|
| DE | 19637884 | 4/1998 |
| EP | 1875949 | 1/2008 |

(Continued)

OTHER PUBLICATIONS

PCT/US2018/029468 Invitation to Pay Additional Fees dated Jun. 20, 2018.

*Primary Examiner* — Brent W Herring
(74) *Attorney, Agent, or Firm* — Fletcher Yoder, P.C.

(57) ABSTRACT

A dome ride system includes a dome, a cartridge, receptacles of the cartridge configured to secure users, a media system configured to communicate a narrative to the users disposed within the cartridge utilizing an interior surface of the dome to display a visual aspect of the narrative, and a drive system. The cartridge is configured to be disposed within the dome, the dome is engaged with the drive system and configured to rotate in multiple directions about a center of the dome in response to input from the drive system, and the cartridge is configured to be coupled to and rotate with the dome.

21 Claims, 7 Drawing Sheets

(51) Int. Cl.
*E04B 1/00* (2006.01)
*E04B 1/32* (2006.01)

(56) References Cited

U.S. PATENT DOCUMENTS

| | | | |
|---|---|---|---|
| 5,052,932 A | 10/1991 | Trani | |
| 5,060,932 A | 10/1991 | Yamaguchi | |
| 5,678,889 A | 10/1997 | Purcell, Jr. | |
| 5,725,435 A * | 3/1998 | De Castro Faria | A63G 31/00 472/47 |
| 6,017,276 A | 1/2000 | Elson et al. | |
| 6,024,647 A | 2/2000 | Bennett et al. | |
| 6,053,576 A | 4/2000 | Jessee | |
| 6,354,954 B1 | 3/2002 | Sumner | |
| 6,719,563 B2 * | 4/2004 | Donges | G09B 9/05 434/29 |
| 8,225,555 B2 * | 7/2012 | Magpuri | A63G 31/16 52/10 |
| 8,474,191 B2 * | 7/2013 | Magpuri | A63G 31/16 52/10 |
| 8,578,857 B2 * | 11/2013 | Crawford | A63G 31/16 104/83 |
| 8,795,095 B2 * | 8/2014 | Stoker | A63G 31/16 472/43 |
| 9,011,259 B2 * | 4/2015 | Schmidt | A63G 31/16 434/29 |
| 9,084,941 B1 * | 7/2015 | Fram | A63G 31/16 |
| 9,149,728 B2 * | 10/2015 | Beyr | A63G 31/16 |
| 9,358,473 B2 * | 6/2016 | Frolov | A63F 13/837 |
| 9,387,409 B2 * | 7/2016 | Schmidt | A63G 31/16 |
| 9,669,325 B2 * | 6/2017 | Li | A63G 31/16 |
| 9,943,773 B2 * | 4/2018 | Li | A63G 31/16 |
| 9,981,194 B1 * | 5/2018 | Jennings | A63G 31/02 |
| 2005/0014566 A1 * | 1/2005 | Hashimoto | A63G 31/16 472/59 |
| 2011/0203190 A1 * | 8/2011 | Magpuri | A63G 31/16 52/10 |
| 2012/0317889 A1 * | 12/2012 | Magpuri | A63G 31/16 52/9 |
| 2013/0145953 A1 * | 6/2013 | Crawford | A63G 31/16 104/28 |
| 2014/0087334 A1 | 3/2014 | Schlusselberger | |
| 2015/0065260 A1 * | 3/2015 | Beyr | A63G 31/16 472/60 |
| 2015/0190726 A1 * | 7/2015 | Frolov | A63F 13/837 472/61 |
| 2016/0317942 A1 | 11/2016 | Li et al. | |
| 2016/0325201 A1 | 11/2016 | Li et al. | |
| 2017/0225084 A1 * | 8/2017 | Snyder | A63G 7/00 |

FOREIGN PATENT DOCUMENTS

| | | | | |
|---|---|---|---|---|
| EP | 1882504 A1 | 1/2008 | | |
| JP | 2013226231 | 11/2013 | | |
| WO | 2009092452 A1 | 7/2009 | | |
| WO | 2012016416 A1 | 2/2012 | | |
| WO | WO-2015071693 A1 * | 5/2015 | | A63J 25/00 |
| WO | WO-2015074086 A2 * | 5/2015 | | A63G 31/00 |

* cited by examiner

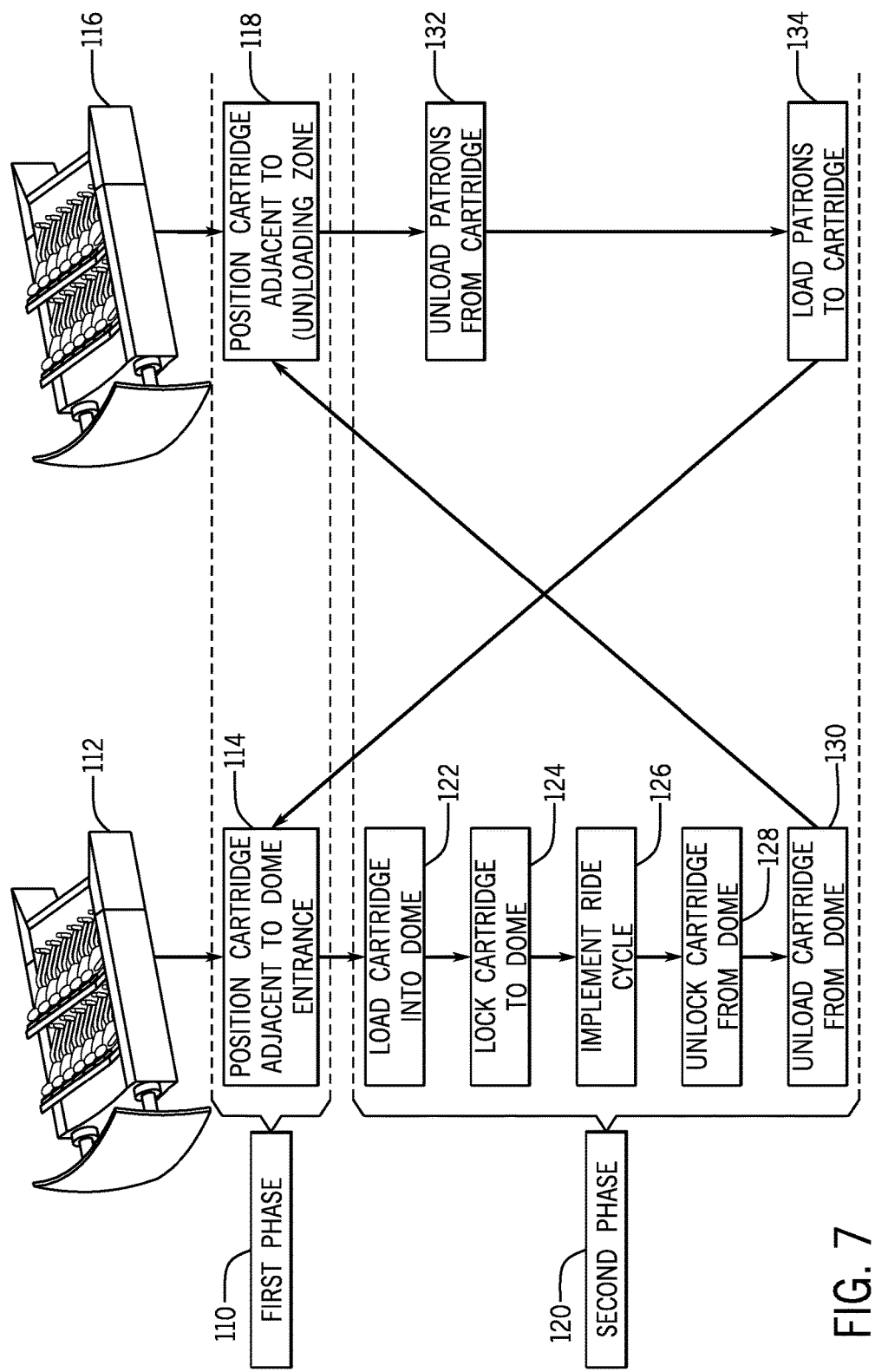

DOME THEATER RIDE SYSTEM AND METHOD

CROSS-REFERENCE TO RELATED APPLICATION

This application claims priority to and the benefit of U.S. Provisional Application No. 62/490,933 entitled "DOME THEATER RIDE SYSTEM," filed Apr. 27, 2017, which is hereby incorporated by reference in its entirety for all purposes.

FIELD OF DISCLOSURE

The present disclosure relates generally to the field of amusement parks. More particularly, embodiments of the present disclosure relate to systems and methods for amusement park rides with a theater component.

BACKGROUND

Recently there has been a growing interest in immersive theater experiences. For example, a user may wish to physically feel as though they are experiencing a narrative of a theater in addition to simply watching the narrative on a screen. Some systems have attempted to enhance the experience of the user via slight actuations (e.g., vibration, tilting, etc.) of the user's seat while the user is looking forward to view the narrative on a two-dimensional screen. However, these slight actuations and narrow viewing angles provide a limited immersive experience for the user.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a dome ride system includes a dome, a cartridge, receptacles of the cartridge configured to secure users, a media system configured to communicate a narrative to the users disposed within the cartridge utilizing an interior surface of the dome to display a visual aspect of the narrative, and a drive system. The cartridge is configured to be disposed within the dome. The dome is engaged with the drive system and configured to rotate in multiple directions about a center of the dome in response to input from the drive system, and the cartridge is configured to be coupled to and rotate with the dome.

In another embodiment, a system includes a dome substantially spherical in shape, a ride vehicle configured to secure one or more users disposed within the dome, and a media system configured to display images to the one or more users via an interior surface of a first hemisphere of the dome. The system also includes a drive system configured to rotate the dome in all directions about the center of the dome. The ride vehicle is coupled to the dome such that the ride vehicle rotates in conjunction with the dome.

In another embodiment, a method includes positioning, via a first translation of a conveyance system, a first cartridge adjacent to a dome entrance of a dome. The first cartridge comprises a first ride vehicle. The method also includes positioning, via the first translation of the conveyance system, a second cartridge adjacent to a first loading zone. The second cartridge comprises a second ride vehicle. The method further includes inserting the first cartridge within the dome, implementing a ride cycle, withdrawing the first cartridge from the dome, and transferring users between the second cartridge and the first loading zone.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 7 is a flow diagram of throughput of users within the dome ride system of FIG. 1, in accordance with an embodiment of the present disclosure.

DETAILED DESCRIPTION

The present disclosure provides systems and methods for fully encompassing users within a dome during a theme park ride to provide an immersive experience for the users. For certain types of theme rides, users may be disposed within seats positioned toward a substantially flat screen to view various media. These theme rides may attempt to enhance a thrill factor of the theme ride by actuating (e.g., vibrating, tilting) the seats in accordance with a narrative of the media displayed on the screen. However, such features are becoming commonplace and may provide limited enhancement to a thrill factor of a typical user.

Accordingly, in certain embodiments, an amusement park dome ride, or dome ride, is provided that may enhance a thrill factor of one or more users by enabling full rotation about all axes in accordance with a narrative of the dome ride. Specifically, the users may be secured within seats rigidly coupled to a dome of the dome ride. The dome may also be coupled to a drive system, which may include, for example, one or more spherical induction motors to enable rotation of the dome about all axes. To enhance a thrill factor of the users, the users may be disposed within and secured to the dome such that, as the dome rotates, the users rotate in conjunction with the dome. Indeed, in some embodiments, the users may be rotated, inverted, horizontal, vertical, etc. Specifically, the users may be secured within the dome and face a particular hemisphere of the dome that may display a narrative via one or more media systems such as a display screen. That is, the users may continuously observe the narrative of the media system on the particular hemisphere while also rotating in accordance with the narrative. The one or more media systems may also include a special effects system and an audio system. For example, through the rotation of the dome, the display of the narrative, audio from the audio system, and special effects from the special effects system, the users may feel as though they are in a boulder gaining speed as it rolls down a slope, while in reality, the dome is simply being rotated faster and faster by the drive system and the users' sensory systems are being stimulated by the media systems.

In certain embodiments, the users may be disposed within a cartridge configured to be inserted into and retrieved from the dome. Accordingly, the dome ride may contain multiple cartridges to enable a higher throughput of users experiencing the dome ride. For example, a first set of users in a first cartridge may be within the dome experiencing the narrative of the dome ride while a second set of users in a second cartridge is positioned adjacent the dome and poised to be inserted into the dome. Once the narrative concludes for the first set of users and the first cartridge is removed from the dome, the second cartridge may be inserted into the dome shortly thereafter.

Figure 1:
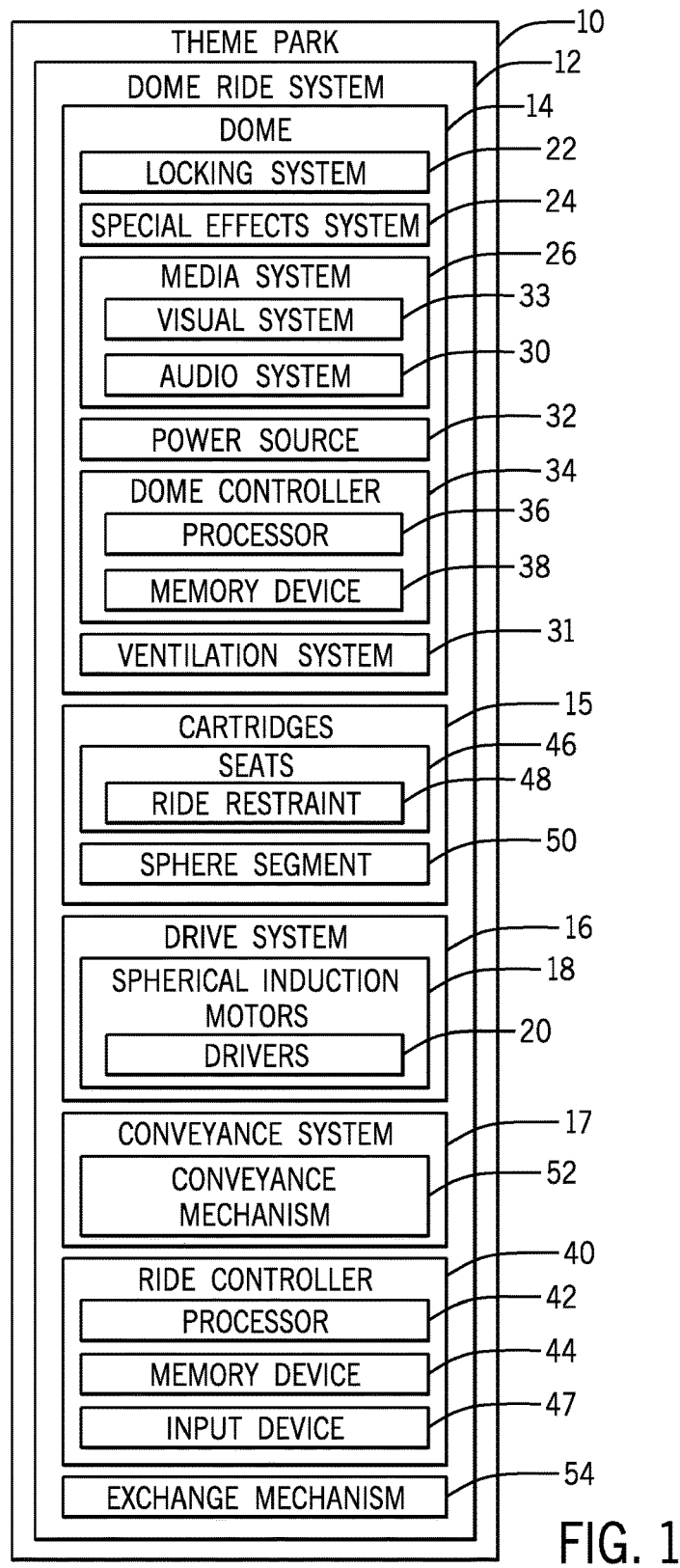
FIG. 1 is a block diagram of a theme park with a dome ride system, in accordance with an embodiment of the present disclosure.

Keeping this in mind, FIG. 1 is a block diagram illustrating features of a theme park 10 that may include a dome ride system 12 (e.g., a dome theater ride). The dome ride system 12 may further include one or more domes 14, one or more cartridges 15 (e.g., ride vehicles), one or more drive systems 16, and one or more conveyance systems 17. Each dome 14 may be coupled to, disposed atop, or disposed partially within the drive system 16, which may rotate the dome 14. For example, the drive system 16 may include one or more spherical induction motors 18 which may rotate the dome 14 in any direction about a center of the dome 14. Particularly, in some embodiments, the dome 14 may be at least partially disposed within a spherical induction motor 18, which may directly rotate the dome 14 in accordance with a narrative of the dome ride system 12. In other embodiments, multiple spherical induction motors 18 may each rotate respective drivers 20 (e.g., roller balls, roller tires) which may then transfer rotational motion to the dome 14 to rotate the dome 14 in accordance with a narrative of the dome ride system 12. In some embodiments, a narrative may be defined as a story, or scenario, that the dome ride system 12 may convey to users, for example, through communication of media (e.g., pictures, sounds, etc.) and actuations (e.g., rotations) of the dome 14. Specifically, the users may be immersed in the narrative of the dome ride system 12 during a ride cycle, or a period of time in which the users are within the dome 14 and experiencing the narrative.

The dome 14 may also include a locking system 22, which may secure one of the cartridges 15 within the dome 14, a special effects system 24, which may administer a variety of special effects to the user while experiencing the dome ride system 12, and a media system 26. The media system 26 may further include a visual system 33 (e.g., display screen, projector, etc.), which may display a series of images (e.g., a visual aspect, a movie) in accordance with the narrative of the dome ride system 12, and an audio system 30, which may emit audio (e.g., an audio aspect) related to a narrative of the dome ride system 12. Further, the dome 14 may be supplied power from a power source 32, which may be any suitable power source. For example, the power source 32 may be a battery disposed within the dome 14, an electrical grid from which the dome 14 draws power, a generator, or any combination thereof. The dome 14 may also include a ventilation system 31 (e.g., a heating, ventilating, and air conditioning (HVAC) system), as described below.

Further, each dome may also include a dome controller 34, which may control certain features of the dome ride system 12. The dome controller 34 (e.g., a programmable logic controller (PLC)) may be any device employing a processor 36 (which may represent one or more processors), such as an application-specific processor. The dome controller 34 may also include a memory device 38 for storing instructions executable by the processor 36 to perform methods and control actions described herein relating to the dome ride system 12. The processor 36 may include one or more processing devices, and the memory device 38 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 36 or by any general purpose or special purpose computer or other machine with a processor.

The dome controller 34 may be communicatively coupled to a ride controller 40. The ride controller 40 may utilize a processor 42 and a memory device 44, which may be similar to the processor 36 and the memory device 38 of the dome controller 34. Particularly, a ride operator may control various functions/elements of the dome ride system 12 through one or more input devices 47 (e.g., buttons, knobs, touch screens, computer, etc.) of the ride controller 40.

As mentioned above, the dome ride system 12 may also include the one or more cartridges 15, which users may be secured to, and one or more conveyance systems 17, which may provide for an efficient throughput of users through the dome ride system 12. Each cartridge 15 may also include one or more receptacles, such as seats 46, each fitted with a ride restraint 48 (e.g., a traditional rollercoaster ride restraint), and a sphere segment 50, which may be a portion of a sphere with a curvature substantially matching that of the dome 14. The conveyance system 17 may include a conveyance mechanism 52, such as a belt or track, which may move the cartridges 15 through the dome ride system 12. Further, the dome 14, cartridge 15, and/or the conveyance mechanism 52 may include an exchange mechanism 54, which may provide for the insertion and the withdrawal of the cartridges 15 into and out of the dome 14.

Figure 2:
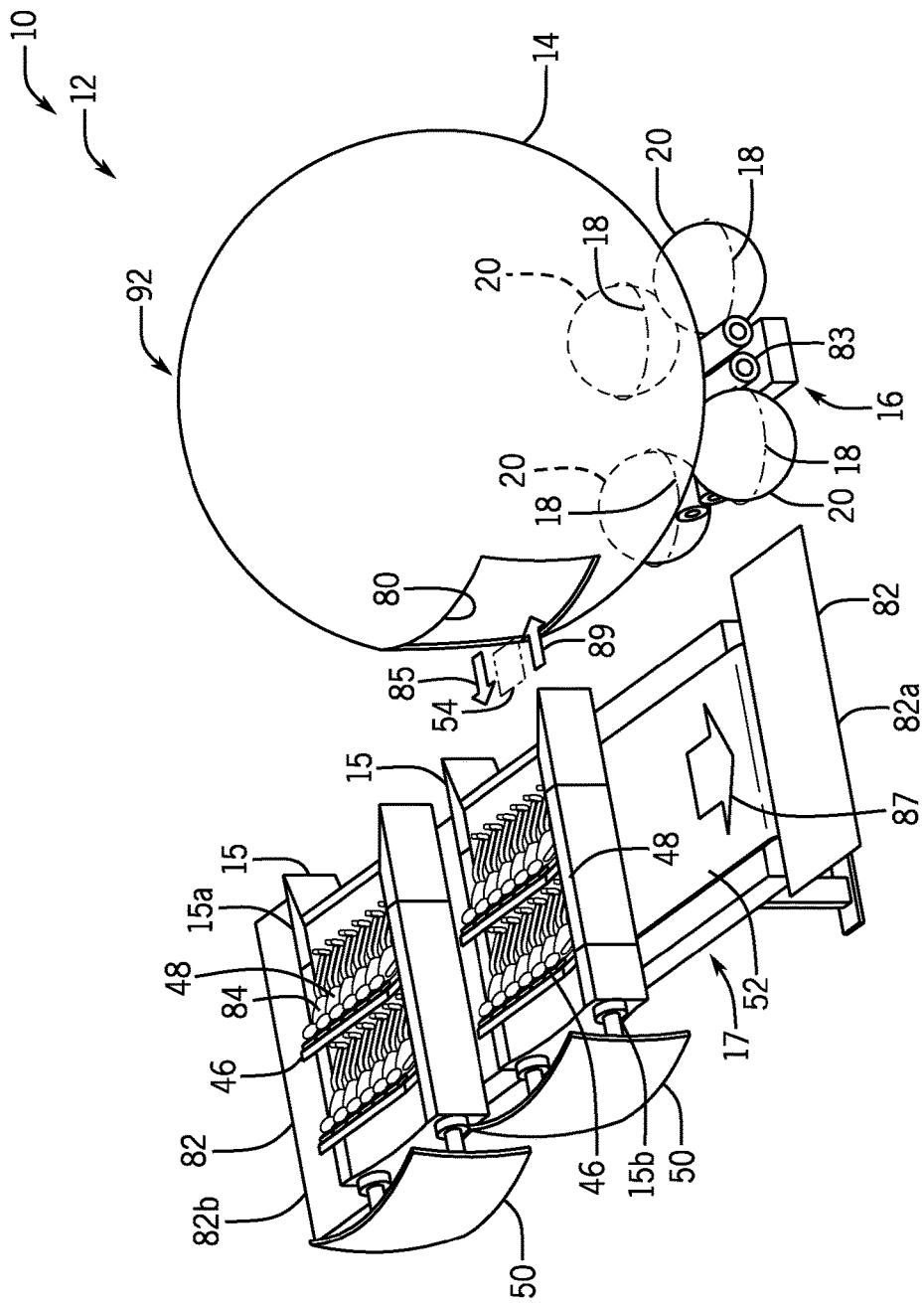
FIG. 2 is a perspective view of the dome ride system of FIG. 1, in accordance with an embodiment of the present disclosure.
Figure 3:
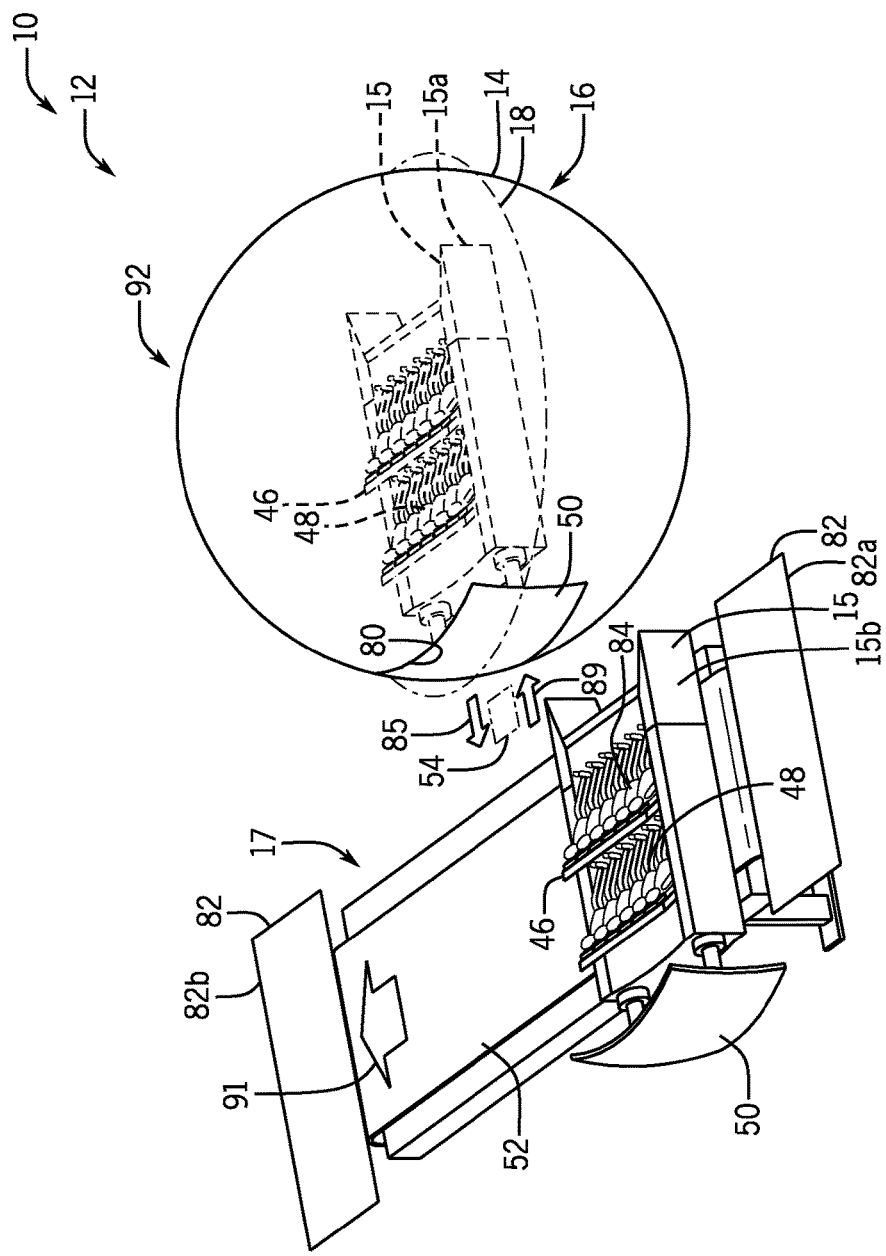
FIG. 3 is a perspective view of the dome ride system of FIG. 1, in accordance with an embodiment of the present disclosure.

FIGS. 2 and 3, herein discussed in parallel, are perspective views of the dome ride system 12. First, it should be noted that, in some embodiments, there may be multiple dome ride systems 12 within the theme park 10. In certain embodiments, each dome ride system 12 includes, among other features, at least one dome 14, at least two cartridges 15, and at least one conveyance system 17. The conveyance system 17 may be disposed adjacent to a dome entrance 80 of the dome 14 and one or more loading zones 82. Particularly, the conveyance system 17 moves the cartridges 15 via the conveyance mechanism 52 for positioning the cartridges 15 adjacent to one or more of the loading zones 82 for loading and unloading users 84. The conveyance system 17 also moves the cartridges 15 via the conveyance mechanism 52 for positioning the cartridges 15 adjacent to the dome entrance 80 for insertion of the cartridges 15 into the dome 14. For example, the conveyance system 17 may position one of the cartridges 15, which may contain users 84 from a previous ride cycle, adjacent to the loading zone 82. The users 84 from the previous ride cycle may then exit the cartridge 15 onto the loading zone 82. After the users 84 from the previous ride cycle exit the cartridge 15, users 84, which may be waiting on/near the loading zone 82 may board the cartridge 15 to start a new ride cycle. In one embodiment, multiple cartridges 15 may be maneuvered along a single conveyance system 17 and may each interact with multiple domes 14 as the ride progresses.

For an efficient throughput of users 84 through the dome ride system 12, some users 84 may be loading/unloading from a particular cartridge 15 while the users 84 of another cartridge 15 are experiencing the narrative (e.g., a ride cycle) within the dome 14. To illustrate, a process of efficient throughput of users 84 through the dome ride system 12 is shown in FIGS. 2 and 3. In FIG. 2, the cartridge 15*a* may have just been loaded with users 84 while the cartridge 15*b* may have just finished a ride cycle within the dome 14 and has been transferred out of the dome 14 to the conveyance system 17 as shown by arrow 85 via the exchange mechanism 54. Once the cartridge 15*b* has moved to the conveyance system 17, the conveyance system 17 may translate both cartridges 15*a*, 15*b* in a direction as illustrated by arrow 87 such that the cartridge 15*b* is adjacent to one of the loading zones 82 (e.g., loading zone 82*a*) and the cartridge 15*a* is positioned adjacent to the dome entrance 80. Once the cartridge 15*b* has been moved to a location adjacent to the loading zone 82*a* as depicted in FIG. 3, the users 84 within the cartridge 15*b* may exit the cartridge 15*b* and new users 84 may board the cartridge 15*b*. Further, once the cartridge 15*a* is positioned in the location adjacent to the dome entrance 80, the cartridge 15*a* may enter the dome 14 as shown by arrow 89 via the exchange mechanism 54. Indeed, in some embodiments, the exchange mechanism 54 may insert and retrieve users 84 from the dome 14 in a substantially horizontal direction.

Once inside the dome 14, the users 84 of the cartridge 15*a* may experience a ride cycle as described below. Indeed, while the cartridge 15*a* is being transferred into the dome 14 and/or is experiencing a ride cycle, users 84 may be exiting and/or boarding the cartridge 15*b*. After the ride cycle is complete for the cartridge 15*a*, the cartridge 15*a* may once again be transferred to the conveyance system 17, as shown by arrow 85, via the exchange mechanism 54. After the cartridge 15*a* has been transferred to the conveyance system 17, the conveyance system 17 may shift the both of the cartridges 15*a*, 15*b* towards the other loading zone 82*b* as shown by arrow 91 such that the cartridge 15*a* is positioned adjacent to the other loading zone 82*b* and the cartridge 15*b* is positioned adjacent to the dome entrance 80 as depicted in FIG. 2. Indeed, once the cartridge 15*a* is adjacent to the other loading zone 82*b*, users 84 may exit and/or board the cartridge 15*a* while the cartridge 15*b* is loaded into the dome 14 as shown by arrow 89 via the exchange mechanism 54. Once the cartridge 15*b* is finished with a ride cycle, the process of efficient throughput of users 84 through the dome ride system 12 may start again, for example, with the cartridge 15*b* being transferred out of the dome 14 to the conveyance system 17, as shown by arrow 85, via the exchange mechanism 54.

To transfer the cartridge 15 between the conveyance system 17 and the dome 14, the dome ride system 12 may utilize the exchange mechanism 54 as discussed above. In some embodiments, the exchange mechanism 54 may utilize a telescoping section that may extend into the dome 14 to insert and retrieve the cartridge 15 to and from the dome 14. In some embodiments, a section of the conveyance system 17 may function as the exchange mechanism 54, which may rotate and/or extend toward and/or into the dome 14 to retrieve and/or insert the cartridge 15 from the dome 14. Similarly, in some embodiments, the dome 14 may include a section that may function as the exchange mechanism 54, which may extend to the conveyance system 17 to receive and/or retrieve the cartridge 15 from the conveyance system 17. More particularly, in some embodiments, the dome 14 and/or conveyance system 17 may include one or more systems configured to engage and disengage the cartridge 15 to facilitate transference of the cartridge 15 between the dome 14 and the conveyance system 17. For example, the exchange mechanism 54 and/or the cartridge 15 may include a hook/loop, one or more magnets, or any other suitable mechanism to engage the cartridge 15 such that the cartridge 15 can be pulled or pushed to and from the conveyance system 17 and/or the dome 14.

In some embodiments, the conveyance system 17 and/or the exchange mechanism 54 may actuate in response to one or more signals from the ride controller 40. For example, the ride controller 40 may send one or more translation signals to the conveyance system 17, which may cause the conveyance system 17 to translate one or more of the cartridges 15 in a direction as illustrated by arrow 87 and/or 91. Indeed, a translation of the conveyance system 17 may be defined as a movement of the conveyance mechanism 52 in a single direction, which in some embodiments, may translate the cartridge 15 towards either the loading zone 82*a* or the loading zone 82*b*. Similarly, the ride controller 40 may send one or more exchange signals to the exchange mechanism 54, which may cause the exchange mechanism 54 to transfer the cartridge 15 between the conveyance system 17 and the dome 14 in a direction as illustrated by arrow 85 and/or 89.

Further, as mentioned above, the dome 14 may be substantially spherical in shape. In some embodiments, a portion of the dome 14 that the dome entrance 80 covers may be exposed to allow insertion of the cartridge 15 through the dome entrance 80. Therefore, each cartridge 15 may be coupled to the sphere segment 50, which corresponds to the (exposed) portion of the dome 14 at the dome entrance 80. Particularly, an end of the cartridge 15 may be coupled to the sphere segment 50, which may substantially match the curvature of the dome 14. Therefore, when the cartridge 15 is inserted into the dome 14 at a start of each ride cycle, the sphere shape of the dome 14 may be completed by the partial-sphere shape of the sphere segment 50. Additionally, or in the alternative, the dome 14 may include a partial-sphere shaped door (e.g., hatch, sphere segment door) that may be opened and closed (e.g., via hinges) to allow the cartridge 15 to enter, exit, and be closed within the dome 14. Overall, the section of the dome 14 through which the cartridge 15 may traverse (e.g., the dome entrance 80) may be covered (e.g., sealed) by the sphere segment 50 and/or the partial-sphere shaped door such that substantially no external light (e.g., light pollution, light intrusion) extends into the dome 14 while the cartridge 15 is disposed within the dome 14. Indeed, in some embodiments, the dome 14 and the sphere segment 50 may substantially be formed by an opaque material to prevent light pollution from entering the interior of the dome 14. Further, the sphere segment 50 may serve as a surface for image presentation (e.g., projection).

During a ride cycle, the cartridge 15 may be coupled to the dome 14, which may rotate about its center in accordance with the narrative of the dome ride system 12. In this manner, the cartridge 15 may also rotate in conjunction with the dome 14 in accordance with the narrative of the dome ride system 12. Particularly, the drive system 16 may rotate the dome 14 and the cartridge 15. In certain embodiments, as illustrated in FIG. 2, the drive system 16 may include three or four spherical induction motors 18, each having the drivers 20 (e.g., roller balls) disposed at least partially within a respective spherical induction motor 18. In such embodiments, the spherical induction motors 18 may be disposed in a substantially horizontal plane relative to one another with a portion of each of the drivers 20 exposed in the vertical direction to contact the dome 14. In this manner, each spherical induction motor 18 may rotate its respective driver 20 in any direction, which in turn transfers rotational motion to the dome 14, which sits atop and is in contact with each of the drivers 20. In other words, the rotation of the drivers 20 may rotate the dome 14. Indeed, in some embodiments, the drivers 20 may include a frictional coating to prevent the dome 14 from slipping relative to the drivers 20. In some embodiments, although the drivers 20 provide motivation for rotation of the dome 14, the weight of the dome 14 may be at least partially supported by three or more supports 83 such that the spherical induction motors 18 experiences a limited amount of the weight of the dome 14. Each support 83 may contact the dome 14 with one or more roller bearings, or other friction-reducing elements such that each support 83 imparts limited frictional resistance to the rotation of the dome. Further, in some embodiments, the dome 14 may rotate in any direction about its center through contact with three or more tires (e.g., one or more toroids, wheels, etc.). However, unlike the drivers 20, each tire may rotate in a respective singular rotational plane. Indeed, in such embodiments, the direction of rotation of the dome 14 may be a combination of the respective singular rotational planes of the tires, which therefore also enables the dome 14 to rotate in any direction about the center of the dome 14.

In certain embodiments, as illustrated in FIG. 3, the dome 14 may be at least partially disposed within a spherical induction motor 18 of the drive system 16. Particularly, the spherical induction motor 18 may directly rotate the dome 14 in any direction about the center of the dome 14. Further, it should be noted that each spherical induction motor 18, whether rotating the dome 14 directly or rotating a respective driver 20, which in turn transfers rotation to the dome 14, may be a three or more degrees of freedom bearingless induction motor. For example, in some embodiments, each spherical induction motor 18 may include three stators with either, one of the drivers 20 (FIG. 2) or the dome 14 (FIG. 3), as the rotor. Indeed, the drivers 20 and/or the dome 14 may be at least partially composed of a conductive and/or magnetic material such as stainless steel to promote induction.

In the current embodiment, users 84 disposed within the cartridge 15 may be in a leaned back position. Particularly, the seats 46 of the cartridge 15 may enable users 84 to face a generally upward position during a ride cycle. In this manner, once inside the dome 14, the users 84 will have a view of an upper hemisphere 92 of the dome 14, which may display images in accordance with the narrative of the dome ride system 12. Each seat 46 may also be associated with one of the ride restraints 48. Each of the ride restraints 48 may secure one of the users 84 to one of the seats 46 such that, regardless of the orientation of the cartridge 15, the user 84 will remain secured to the seat 46. Additionally, or in the alternative, the one or more users 84 may be lowered or raised into the dome 14 (e.g., while in a cartridge and/or a ride vehicle) and disposed within the dome 14 in a substantially vertical position (e.g., standing position) looking substantially forward to start a ride cycle.

Figure 4:
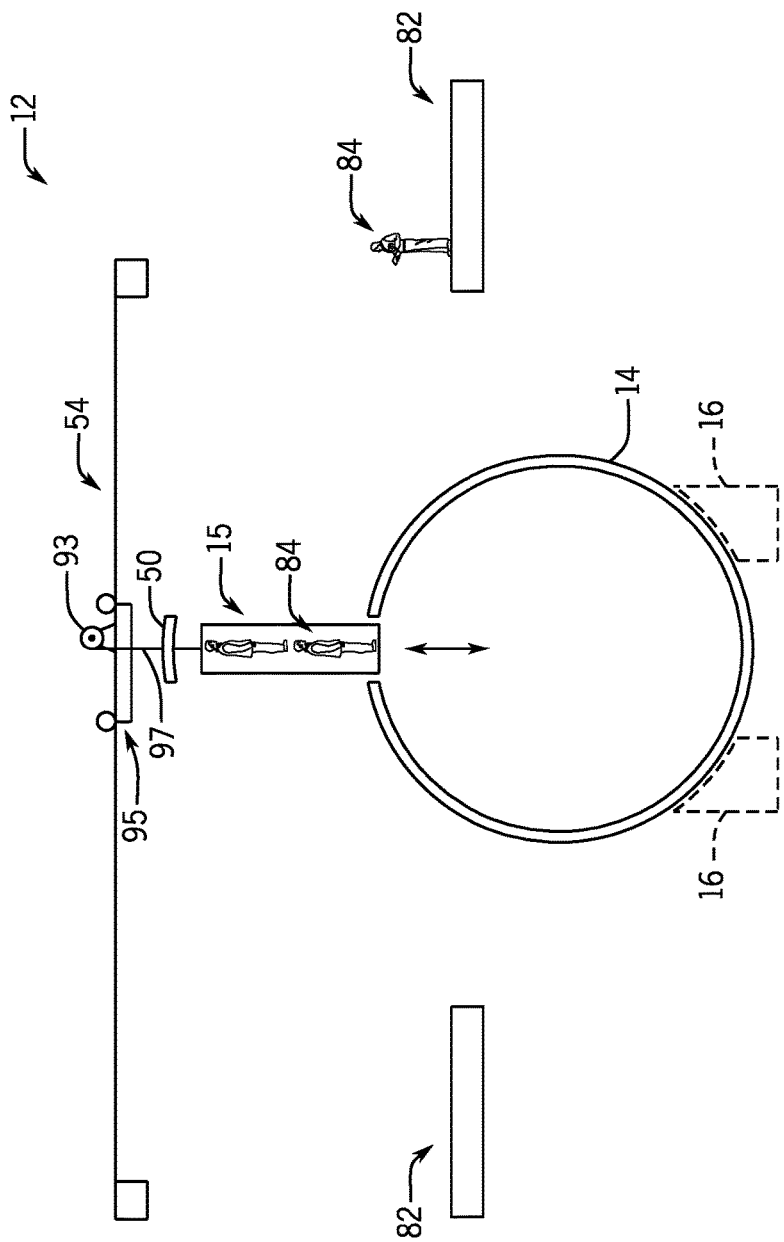
FIG. 4 is a schematic view of the dome ride system of FIG. 1, in accordance with an embodiment of the present disclosure.
Figure 5:
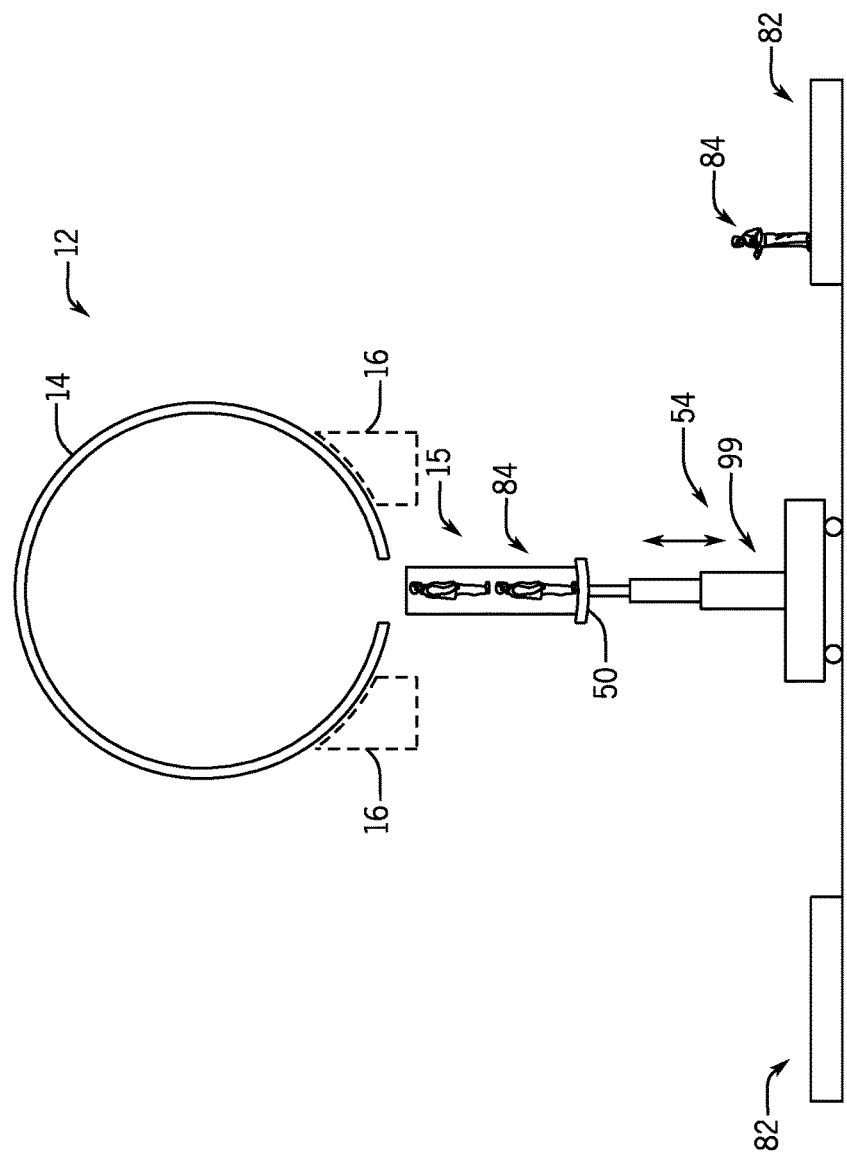
FIG. 5 is a schematic view of the dome ride system of FIG. 1, in accordance with an embodiment of the present disclosure.

To illustrate, FIGS. 4 and 5 are schematic views of embodiments in which the users 84 may be lowered or raised into and out of the dome 14. For example, as shown in FIG. 4, the exchange mechanism 54 may include a winch 93, a bogey 95, and a cable 97. The bogey 95 may travel between the dome 14 and the loading zones 82 such that the users 84 may load and unload from the cartridge 15 and be inserted and withdrawn from the dome 14. Particularly, the winch 93 may raise and lower the cartridge 15 via the cable 97 to pick up the users 84, insert the users 84 into the dome 14, retrieve the users 84 from the dome 14, and allow the users 84 to disembark from the cartridge 15 to the loading zone 82. Further, as shown in FIG. 5, the exchange mechanism 54 may include a hydraulic stand 99. The hydraulic stand 99 may travel between the dome 14 and the loading zones 82 such that the users 84 may load and unload from the cartridge 15 and be inserted and withdrawn from the dome 14. Particularly, the hydraulic stand 99 may raise and lower the cartridge 15 to pick up the users 84, insert the users 84 into the dome 14, retrieve the users 84 from the dome 14, and allow the users 84 to disembark from the cartridge 15 to the loading zone 82. Indeed, in some embodiments, as shown in FIGS. 4 and 5, the exchange mechanism 54 may insert and retrieve users 84 to and from the dome 14 in a substantially vertical direction. In other embodiments, different lifting/lowering mechanisms may be used. For example, the winch 93 and cable 97 in FIG. 4 may be replaced by hydraulics. Further, various mechanisms for adjusting the cartridge 15 may be used to facilitate entry and exit of the cartridge 15 and the users 84.

Figure 6:
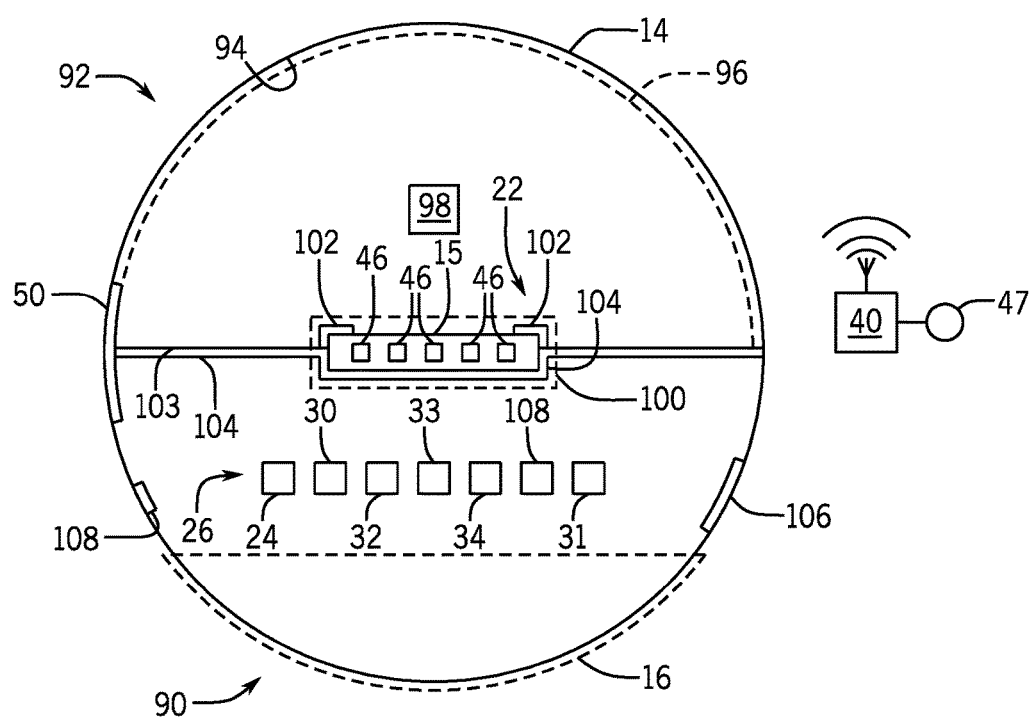
FIG. 6 is a cross-sectional schematic view of the dome ride system of FIG. 1, in accordance with an embodiment of the present disclosure.

While inside the dome 14, the cartridge 15 may be disposed such that a center of the cartridge 15 is located substantially at the center of the dome 14. For example, as seen in FIG. 6, which is a cross-sectional schematic view of the dome 14, the cartridge 15 is disposed within the dome 14 separating a lower hemisphere 90 from an upper hemisphere 92. In other words, the cartridge 15 may bisect the dome 14. In this manner, during a ride cycle, users seated in the cartridge 15 may have a view of an interior surface 94 of the upper hemisphere 92 of the dome 14. For example, a substantial portion, or all, of the interior surface 94 of the upper hemisphere 92 may be utilized to display images to help provide an immersive experience of for the users. Particularly, the upper hemisphere 92 may include one or more screens 96 or projections of the visual system 33 that users may view to see images (e.g., a movie) in accordance with the narrative of the dome ride system 12. The one or more screens 96 may utilize light-weight, flexible, self-emitting (e.g., does not require a backlight), and/or electroluminescent displays to present the images to the user. For example, in some embodiments, the dome 14 may utilize an organic light emitting diode (OLED) screen (e.g., wallpaper) and/or a curved light emitting diode (LED) screen that may be used to display the images. Additionally, or in the alternative, the dome 14 may include one or more projectors 98 to project the images onto the interior surface 94 of the upper hemisphere 92. In some embodiments, the interior surface 94 of the lower hemisphere 90 may be viewable in the illustrated orientation via an open or transparent floor.

While viewing the narrative of the dome ride system 12 on the interior surface 94 of the upper hemisphere 92 of the dome 14, the drive system 16 may rotate the dome 14 in line with the narrative. For example, the dome 14 may rotate in line with a narrative of a boulder slowly gaining speed as it rolls down a slope, a narrative of a plane rotating (e.g., pitching), and/or a of a narrative of a ball rolling through an environment. As discussed above, the cartridge 15 disposed within the dome 14 may rotate in conjunction with the dome 14 as the dome 14 rotates. However, in some embodiments, the cartridge 15 may rotate independently of the dome 14 via one or more internal rotational mechanisms 100, which may function similarly to a gyroscope. In such embodiments, the images being displayed to the user may rotate relative to the interior surface 94 of the dome 14 such that users always have a clear view of the images. Further, while every user within the cartridge 15 may rotate within the dome 14, a portion of the users may also revolve about the center of the dome 14. For example, the users may be disposed within the seats 46 of the cartridge 15, which may vary in radial distance relative to the center of the dome 14. Therefore, as the dome 14 rotates, users that are seated radially further away from the center of the dome 14 may experience more movement and centripetal force than users seated radially closer to the center of the dome 14 and the cartridge 15. Regardless of the rotational means, the users and/or the dome 14 may be configured to rotate 360 degrees about all axes.

Further, in some embodiments, the drive system 16 may receive one or more drive signals from the ride controller 40 and/or the dome controller 34. The one or more drive signals may signal for the drive system 16 to rotate the dome 14 such that the rotations of the dome 14 are in accordance with the narrative of the dome ride system 12. For example, the one or more drive signals may cause the drive system 16 to increase rotational speed of the dome 14 if the narrative involves rolling down a slope, or to oscillate about an axis if the narrative involves pitching of a boat or aerial vehicle.

While inside the dome 14, the cartridge 15 may be locked in place via a locking mechanism 102 of the locking system 22. The locking mechanism 102 may be any suitable device/mechanism that may secure the cartridge 15 within the dome 14. For example, in some embodiments, the locking mechanism 102 may include one or more latches configured to engage with a portion of the cartridge 15. In some embodiments, the locking mechanism 102 may be one or more magnets configured to engage with the cartridge 15. Further, while locked within the dome 14 via the locking mechanism 102, the sphere segment 50, which is coupled to the cartridge 15 via an extension 103, may be aligned with the surface of the dome 14 to form a complete sphere with the dome 14 and substantially prevent external light from entering the dome 14. In some embodiments, a platform 104 may support the cartridge 15 and/or the extension 103 while the cartridge 15 is disposed within the dome 14. In some embodiments, the platform 104 may separate the upper hemisphere 92 from the lower hemisphere 90 of the dome 14.

As discussed above, users of the dome 14 may view the interior surface 94 of the upper hemisphere 92 to experience the narrative of the dome ride system 12. Therefore, several elements of the dome ride system 12 may be disposed within the lower hemisphere 90 so as not to obstruct the users from viewing the interior surface 94 of the upper hemisphere 92 of the dome 14. For example, the lower hemisphere 90 of the dome 14 may include the special effects system 24, the audio system 30, the power source 32, the ventilation system 31, and the dome controller 34. The dome 14 may also be equipped with several other entertainment enhancing features. For example, the dome 14 may utilize virtual reality (VR), alternate reality (AR), and/or mixed reality (MR) systems to convey the narrative to the users, for example, via headgear sets associated with each user.

As mentioned above, the special effects system 24 may administer a variety of special effects within the dome 14. For example, the special effects system 24 may administer smoke/vapor/smog, various water effects (e.g., mists, sprays, etc.), vibration effects, scent effects and so forth. Further, the ventilation system 31 may provide conditioned air to the dome 14. Indeed, in some embodiments, the ventilation system 31 may draw external air through one or more vents 106 disposed along the interior surface 94 of the dome 14 and may cool and dehumidify the external air. In some embodiments, the ventilation system 31 may recycle internal air within the dome 14. The special effects system 24 and the ventilation system 31 may operate based on one or more signals received from the dome controller 34 and/or the ride controller 40. For example, the special effects system 24 may administer the various special effects discussed above based on one or more special effects signals received from the dome controller 34 and/or the ride controller 40. Similarly, the ventilation system 31 may control airflow (e.g., flow speed) and temperature based on one or more ventilation signals received from the dome controller 34 and/or the ride controller 40.

Indeed, in some embodiments, the ride controller 40 and the dome controller 34 may be capable of performing similar functions, and in some embodiments, functions of the controllers 34, 40 may be carried out by a singular controller. However, in some embodiments, ride controller 40 may receive input from a ride operator through the one or more input devices 47. The ride controller 40 may then communicate the input via one or more signals to the dome controller 34. The dome controller 34 may then carry out various functions based on the signals received from ride controller 40. For example, the operator may send one or more signals to the dome controller 34 through the ride controller 40 to activate a ride cycle.

Various elements such as the special effects system 24, the media system 26, the power source 32, the dome controller 34, and the ventilation system 31 may also add a weight to the lower hemisphere 90 of the dome 14. In this manner, the dome 14 may be in equilibrium when the dome 14 is in a start position, which may be defined as the cartridge 15 being at a horizontal position and the upper hemisphere 92 disposed completely above the lower hemisphere 90. For example, in some embodiments, a majority of the weight of the dome 14 may be in the lower hemisphere 90 or the upper hemisphere 92, which may cause imbalances in the dome 14. Accordingly, the dome 14 may be weighted via weights 108 such that the dome 14 is biased towards the start position. Additionally, or in the alternative, the dome 14 may include additional weights 108 to suitably distribute weight about the dome 14 for kinematic purposes.

FIG. 7 is a flowchart illustrating throughput of users through the dome ride system 12. During a first phase 110, a first cartridge 112 (e.g., cartridge 15) is positioned adjacent to a dome entrance (block 114) (e.g., via the conveyance system 17). Also during the first phase 110, a second cartridge 116 (e.g., cartridge 15) is positioned adjacent to an unloading/loading zone (block 118). Indeed, blocks 114 and 118 may occur simultaneously during the first phase 110. During a second phase 120, the first cartridge 112 may be loaded into the dome (block 122) (e.g., by the exchange mechanism 54) from the position adjacent to the dome entrance and locked within the dome (block 124) (e.g., via the locking system 22). Once the first cartridge 112 is inside and locked within the dome, the dome ride system 12 may implement a ride cycle for the first cartridge 112 (block 126). The ride cycle may consist of rotating the sphere and the first cartridge 112 in accordance with a narrative of the dome ride system 12. Once the narrative, and more specifically, the ride cycle, is complete, the first cartridge 112 may be unlocked (block 128) and unloaded (block 130) from the dome.

Also during the second phase 120, users that were in the second cartridge 116 may unload from the second cartridge 116 on to the unloading zone (block 132). Once the users have unloaded from the second cartridge 116, new users may board the second cartridge 116 from the loading zone (block 134). After the second phase 120, the first phase 110 may start again with the second cartridge 116 being positioned adjacent to the dome entrance (block 114) and the first cartridge 112 being positioned adjacent to the unloading and loading zone (block 118). In some embodiments, the first and second cartridges 112, 116 may be positioned adjacent to the dome entrance (block 114) and/or adjacent to the unloading and loading zone (block 118) via a single translation of a conveyance system (e.g., conveyance system 17).

While only certain features of present embodiments have been illustrated and described herein, many modifications and changes will occur to those skilled in the art. It is therefore to be understood that the appended claims are intended to cover all such modifications and changes that fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A dome ride system, comprising:
a dome;
a cartridge, wherein the cartridge is configured to be disposed within the dome;
receptacles of the cartridge configured to secure users;
a media system configured to communicate a narrative to the users disposed within the cartridge utilizing an interior surface of the dome to display a visual aspect of the narrative; and
a drive system, wherein the dome is engaged with the drive system and configured to rotate relative to the drive system in multiple directions about a center of the dome in response to input from the drive system, and wherein the cartridge is configured to be coupled to and rotate with the dome.

2. The dome ride system of claim 1, wherein the drive system comprises one or more spherical induction motors.

3. The dome ride system of claim 2, wherein the one or more spherical induction motors comprises three or more spherical induction motors, wherein each spherical induction motor of the three or more spherical induction motors is configured to rotate a driver, wherein the driver of each spherical induction motor is configured to at least partially support the dome, and wherein the dome is configured to rotate in response to rotation of the driver of each spherical induction motor.

4. The dome ride system of claim 1, wherein the dome is at least partially disposed within a spherical induction motor, and wherein the dome is a rotor of the spherical induction motor.

5. The dome ride system of claim 1, wherein the media system utilizes an upper hemisphere of the interior surface of the dome to display the visual aspect of the narrative, and wherein the media system comprises an audio system disposed in a lower hemisphere of the dome and configured to output one or more audio aspects of the narrative.

6. The dome ride system of claim 5, comprising a power source disposed within the lower hemisphere of the dome, and wherein the power source is configured to supply power to the media system.

7. The dome ride system of claim 1, wherein an exterior of the dome is substantially a sphere, and where the cartridge is coupled to a sphere segment, and wherein the sphere segment is configured to complete the exterior of the dome when the cartridge is disposed within the sphere.

8. The dome ride system of claim 1, comprising a conveyance system, wherein the cartridge is a first cartridge and the dome ride system comprises a second cartridge, and wherein the conveyance system is configured to translate the first cartridge and the second cartridge to one or more positions within the dome ride system.

9. The dome ride system of claim 8, wherein the conveyance system is configured to position the first cartridge and the second cartridge adjacent to an entrance of the dome and adjacent to one or more loading zones of the dome ride system, wherein the one or more loading zones are configured to support additional users.

10. The dome ride system of claim 8, comprising an exchange mechanism, wherein the exchange mechanism is configured to transfer the first cartridge and the second cartridge between the conveyance system and the dome.

11. A system comprising:
a dome substantially spherical in shape;
a ride vehicle configured to secure one or more users disposed within the dome;
a media system configured to display images to the one or more users via an interior surface of a first hemisphere of the dome;
a drive system configured to rotate the dome in all directions about a center of the dome, wherein the ride vehicle is coupled to the dome such that the ride vehicle rotates in conjunction with the dome, and wherein the drive system comprises one or more spherical induction motors configured to rotate the dome.

12. The system of claim 11, wherein the drive system comprises three or more wheels, each of the three or more wheels configured to at least partially support the dome and to rotate in a respective rotational plane to rotate the dome.

13. The system of claim 11, wherein the ride vehicle is configured to coordinate with an exchange system to transfer the one or more users into and out of the dome.

14. The system of claim 13, wherein the exchange system is configured to transfer the one or more users into and out of the dome in a horizontal direction or a vertical direction.

15. A method, comprising:
positioning, via a first translation of a conveyance system, a first cartridge from adjacent to a first loading zone to adjacent to an entrance of a dome, wherein the first cartridge comprises a first ride vehicle;
positioning, via the first translation of the conveyance system, a second cartridge from adjacent to the entrance of the dome to adjacent to a second loading zone, wherein the second cartridge comprises a second ride vehicle, and wherein the first loading zone is separate from the second loading zone;
inserting the first cartridge into the dome;
implementing a ride cycle;
withdrawing the first cartridge from the dome; and
transferring users between the second cartridge and the second loading zone.

16. The method of claim 15, comprising:
  positioning, via a second translation of the conveyance system, the first cartridge adjacent to the first loading zone; and
  positioning, via the second translation of the conveyance system, the second cartridge adjacent to the entrance of the dome.

17. The method of claim 16, wherein the first translation of the conveyance system is in a first direction and the second translation of the conveyance system is in a second direction, and wherein the first direction is opposite to the second direction.

18. The method of claim 15, comprising:
  coupling the first cartridge with the dome via a locking mechanism when the first cartridge is within the dome.

19. The method of claim 15, wherein inserting the first cartridge into the dome comprises utilizing an exchange mechanism to transfer the first cartridge from the conveyance system into the dome.

20. The method of claim 15, wherein implementing the ride cycle comprises communicating a narrative to users of the first cartridge via media and rotation of the dome.

21. A dome ride system, comprising:
  a dome, wherein an exterior of the dome is substantially a sphere;
  a cartridge, wherein the cartridge is configured to be disposed within the dome;
  receptacles of the cartridge configured to secure users;
  a media system configured to communicate a narrative to the users disposed within the cartridge utilizing an interior surface of the dome to display a visual aspect of the narrative; and
  a drive system, wherein the dome is engaged with the drive system and configured to rotate in multiple directions about a center of the dome in response to input from the drive system, and wherein the cartridge is configured to be coupled to and rotate with the dome.

* * * * *